(12) United States Patent
O'Connor et al.

(10) Patent No.: US 6,720,884 B2
(45) Date of Patent: Apr. 13, 2004

(54) SENSOR MOUNTING SYSTEM

(75) Inventors: Christopher J. O'Connor, Northville, MI (US); James D. Davis, Jr., Wixom, MI (US)

(73) Assignee: Prospects, Corp., Novi, MI (US)

( * ) Notice: Subject to any disclaimer, the term of this patent is extended or adjusted under 35 U.S.C. 154(b) by 217 days.

(21) Appl. No.: 10/029,062

(22) Filed: Dec. 20, 2001

(65) Prior Publication Data

US 2002/0101694 A1 Aug. 1, 2002

Related U.S. Application Data

(60) Provisional application No. 60/257,081, filed on Dec. 20, 2000.

(51) Int. Cl.$^7$ ............................................... G08B 23/00
(52) U.S. Cl. .............................. 340/643.6; 340/693.9; 340/435; 172/6; 342/69; 342/70; 250/221; 250/239; 361/807
(58) Field of Search ........................... 340/693.5, 540, 340/903, 435, 436, 693.6, 693.9, 552; 318/480, 264, 283, 445; 180/271; 49/28; 172/6; 342/27, 61, 70, 72, 175, 69; 250/221, 239; 356/3; 701/36, 45; 361/679, 728, 807

(56) References Cited

U.S. PATENT DOCUMENTS

| | | | | |
|---|---|---|---|---|
| 4,505,054 A | | 3/1985 | Clark et al. ............... 33/357 |
| 4,687,924 A | * | 8/1987 | Galvin et al. .............. 250/216 |
| 4,859,847 A | * | 8/1989 | Matsuno et al. ............ 250/239 |
| 5,103,917 A | * | 4/1992 | Moore ......................... 172/6 |
| 5,132,534 A | * | 7/1992 | Namigawara ............... 250/239 |
| 5,153,419 A | | 10/1992 | Takahashi ................... 250/201.1 |
| 5,191,222 A | * | 3/1993 | Edwards et al. ............ 250/561 |
| 5,210,406 A | | 5/1993 | Beran et al. ................ 250/221 |
| 5,219,068 A | * | 6/1993 | Piotrowski .................. 200/296 |
| 5,235,574 A | | 8/1993 | Aviles et al. ................ 369/32 |
| 5,357,098 A | * | 10/1994 | Van Gent .................... 250/208.1 |
| 5,457,314 A | * | 10/1995 | Kim et al. ................... 250/239 |
| 5,541,403 A | | 7/1996 | Heinonen et al. .......... 250/221 |
| 5,562,336 A | | 10/1996 | Gotou ......................... 362/37 |
| 5,623,253 A | * | 4/1997 | Narumiya et al. .......... 340/630 |
| 5,880,836 A | | 3/1999 | Lonnqvist ................... 356/336 |
| 5,938,320 A | | 8/1999 | Crandall ..................... 362/494 |
| 5,955,854 A | | 9/1999 | Zhang et al. ............... 318/480 |
| 6,025,797 A | | 2/2000 | Kawai et al. ............... 342/70 |
| 6,479,823 B1 | * | 11/2002 | Strang et al. ............... 250/342 |

* cited by examiner

Primary Examiner—Benjamin C. Lee
(74) Attorney, Agent, or Firm—Weingarten, Schurgin, Gagnebin & Lebovici LLP (57) ABSTRACT

An obstacle detection system for vehicular environments including a monitoring sensor system and a mounting system is disclosed. An installer can make aiming adjustments, in the factory or field, to account for tolerance stack-up. The system includes a housing for mounting the monitoring sensor system to minimize cross-talk and interference between transmitter and receiver sections, to limit sensor system movement, and to enable gross and fine aiming adjustments. In one embodiment, a circuit board is disposed within a cradle assembly which, in turn, is mounted in or integral to the housing to position the obstacle detection sensor as necessary. The cradle in one embodiment is an enclosure for the circuit board. The sensor housing is mounted to the interior vehicle trim, door panel, and/or door sheet metal and ensures consistent mounting regardless of interior trim or factory installation variations. Integral adjustment mechanisms are incorporated for adjusting the orientation of the sensor system. The circuit board may be comprised of plural subsections interconnected by flexible circuit board, enabling accurate alignment of each subsection with respect to the environment to be monitored.

21 Claims, 7 Drawing Sheets

SENSOR MOUNTING SYSTEM

CROSS REFERENCE TO RELATED APPLICATIONS

This application claims priority to U.S. Provisional Patent Application No. 60/257,081, filed Dec. 20, 2000, which is incorporated herein by reference.

STATEMENT REGARDING FEDERALLY SPONSORED RESEARCH OR DEVELOPMENT

BACKGROUND OF THE INVENTION

The present invention relates to an electronic sensor system for monitoring a window, door or other opening associated with a vehicle or vehicle interior, and in particular a system for mounting, aiming, and/or packaging such a sensor system.

In recent years, electronic sensors have not been utilized for obstacle or intrusion detection in vehicle window systems because of complexity and mounting limitations. Typically, obstacle detection has been based on limit switches, window motor characteristics, or ultrasonic monitoring signals that do not have precise mounting or alignment requirements. Small variations in detection system mounting do not significantly effect the performance of these sensor systems. The variations in trim components and installer techniques obviates the use of potentially more sensitive and thus accurate monitoring systems which are subject to performance degradation as a result of misalignment with respect to an ideal mounting configuration.

So-called tolerance stack-up results due to the variability in the physical relationship between a lens to emitters or detectors of an obstacle detection system, emitters or detectors to a circuit board on which they are mounted, the circuit board to the respective housing, the housing to vehicle trim and/or the respective door panel, and vehicle trim and/or the door panel to the door sheet metal. Variations from vehicle to vehicle, door to door, in system installation techniques within the vehicle factory, and in system installation techniques by after-market installers can all add to the tolerance stack-up problem.

BRIEF SUMMARY OF THE INVENTION

The present invention provides an obstacle detection system which includes a monitoring sensor system and a mounting system. In a first embodiment, the obstacle detection system is adapted for use in a vehicular setting. The mounting system presently disclosed allows an installer to make aiming adjustments, in the factory or field, to account for the tolerance stack-up problems described above. The system includes a housing for mounting the monitoring sensor system to minimize cross-talk and interference between the transmitter and receiver sections, to limit sensor system movement based on vehicle component and factory installation variations, and to enable gross and fine aiming to accommodate field programmability.

In a preferred embodiment of the invention, a circuit board is disposed within a cradle assembly which, in turn, is mounted in or integral to the housing to position the obstacle detection sensor in proximity with the target structure or region of the vehicle. The cradle in one embodiment is an enclosure for the circuit board, fabricated from a resilient material such as plastic. Importantly, the cradle does not obstruct or interfere with the operation of the transmitter or receiver associated with the sensor disposed on the circuit board. The cradle may facilitate sensor removal and replacement without requiring the removal of the housing. Thus, once the housing is properly aligned relative to the vehicle trim, maintenance can be performed on the sensor without effecting such alignment. The sensor housing is mounted to the interior vehicle trim, door panel, and/or door sheet metal and ensures consistent mounting regardless of interior trim or factory installation variations. In addition, integral adjustment mechanisms are incorporated in further embodiments to provide the ability to make adjustments in either an initial installation environment or after the vehicle is fielded. In yet another embodiment, the circuit board is comprised of plural subsections interconnected by flexible circuit board, enabling accurate alignment of each subsection with respect to the environment to be monitored. Thus, accurate installation is realized through features which locate the housing relative to the vehicle sheet metal or some other consistent reference surface, through adjustment tools associated with the housing which it is installed, or both.

BRIEF DESCRIPTION OF THE SEVERAL VIEWS OF THE DRAWING

These and other objects of the presently disclosed invention will be more fully understood by reference to the following drawings, of which.

DETAILED DESCRIPTION OF THE INVENTION

The presently disclosed invention enables the accurate installation of an obstacle detection system, such as for use in conjunction with a vehicle window, as well as the alignment of components of the system for optimal performance. An obstacle detection system according to the presently disclosed invention is comprised of the active circuitry responsible for detecting an obstacle and a mounting subsystem which enables accurate alignment of portions of the active circuitry.

Figure 1:
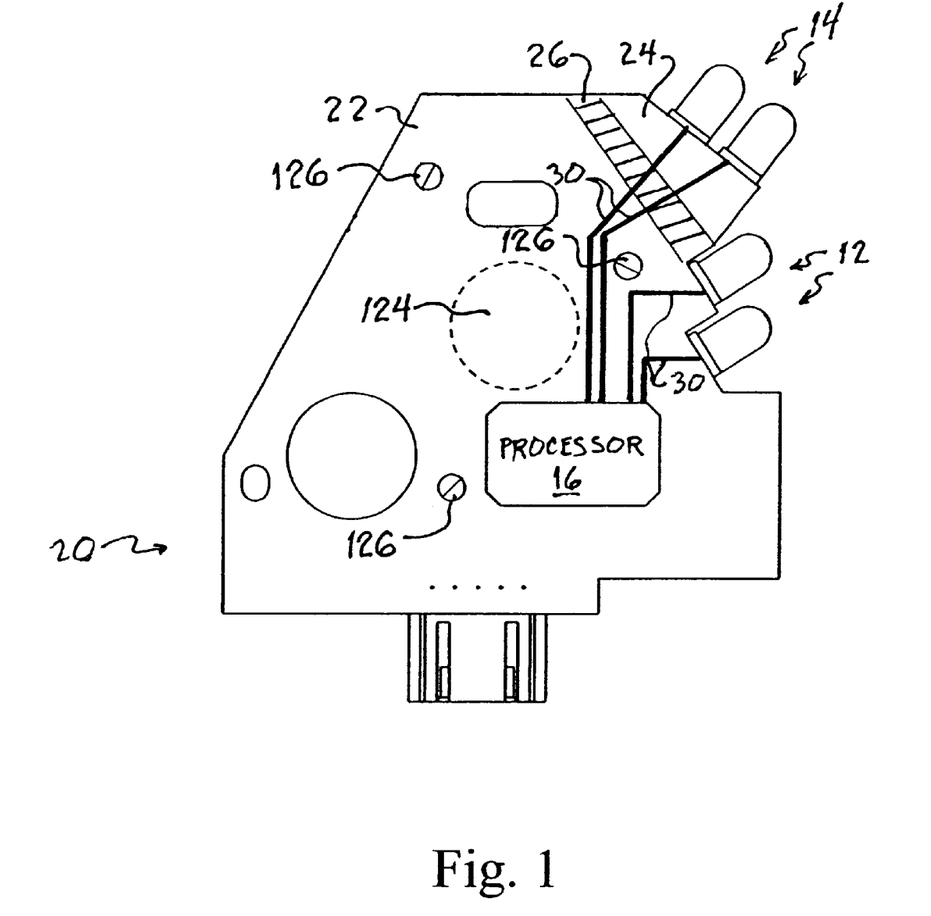
FIG. 1 is a diagrammatic view of components of an obstacle detection system according to the presently disclosed invention.

FIG. 1 provides a schematic illustration of a circuit board employed as part of the active circuitry. The individual active components and their function may be as described in U.S. Pat. No. 5,955,854, owned by the same assignee as the present application and incorporated herein by reference. With reference to FIG. 1, an energy field may be generated proximate a window opening, in which a power window operates, through the use of infrared (IR) light emitting diodes (LEDs) 12. Energy reflected off one or more objects or surfaces in the path of the emitted energy is detected by co-located IR detectors 14. A processor 16, such as a specially-programmed microprocessor with associated memory, is used to control the operation of the emitters 12 and to analyze the output of the detectors 14. However, it should be understood that other components may be substituted to the extent that such components work in concert with the inventive concepts disclosed and claimed herein.

One or more circuit boards 20 are employed for mounting the circuitry. Because the window opening to be monitored is typically non-planar, and as a result of the varying active fields of the emitters 12 and detectors 14, it is often necessary to dispose the active fields of the emitters 12 and detectors 14 in different planes. In the embodiment illustrated in FIG. 1, a circuit board 20 used to mount the active detector system components is comprised of two rigid circuit board portions 22, 24 interconnected by a flexible circuit board portion 26. Signal pathways 30 between the processor 16 and the emitters 12 and detectors 14 are shown schematically. Depending upon the particular physical environment to be monitored, two or more circuit board portions may be interconnected at a variety of locations by flexible portions. The embodiment of FIG. 1 is merely one example.

Figure 2:
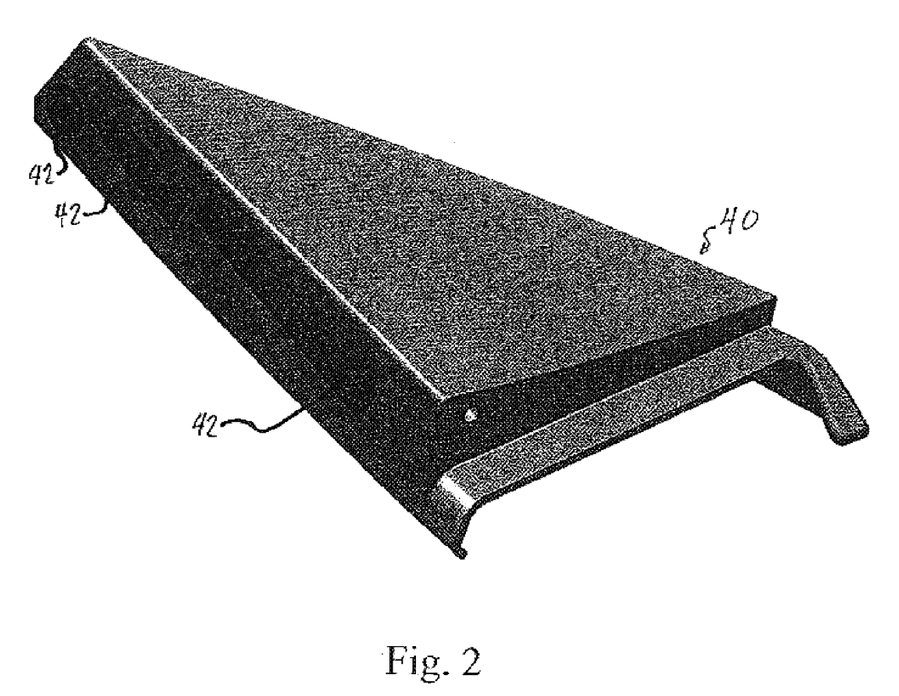
FIG. 2 is a perspective exterior view of a first embodiment of an obstacle detection system housing according to the presently disclosed invention.

The portion of the presently disclosed obstacle detection system used to mount the system in association with the vehicle typically includes a housing 40, such as in the exemplary embodiment of FIG. 2. Preferably, such a housing 40 is fabricated of a material which is complimentary to that of the vehicle trim. Considerations including environment temperature fluctuation, ultraviolet exposure, and physical jarring must be borne in mind in selecting appropriate materials for the housing 40.

Figure 4:
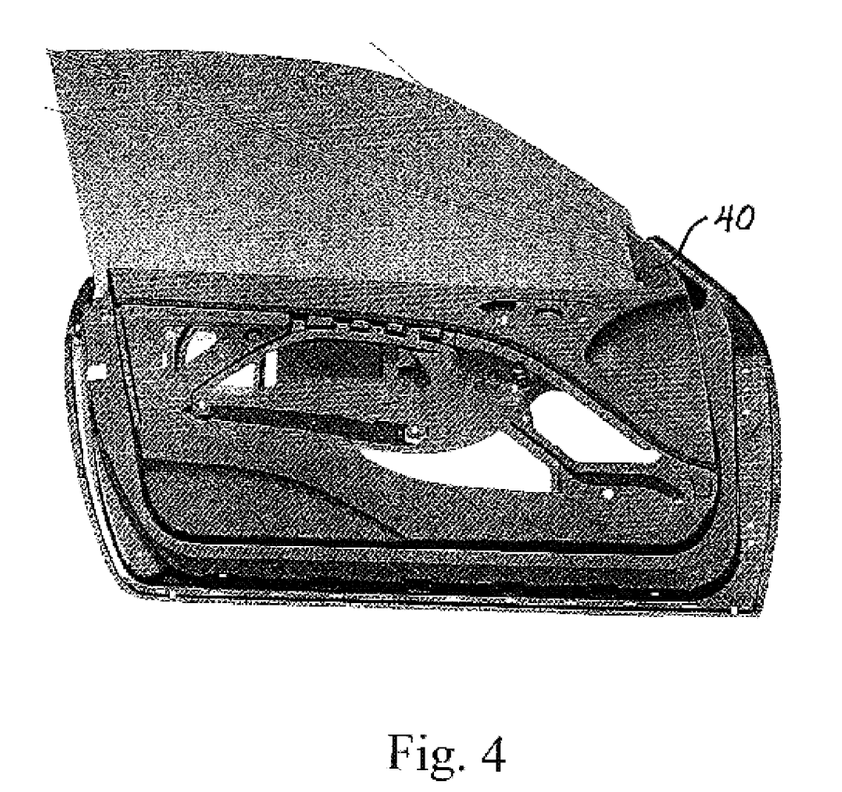
FIG. 4 illustrates the placement of the obstacle detection system of the presently disclosed invention in association with the sheet metal of a vehicle door.

Disposed on a surface of the housing are one or more lenses 42. These lenses may be transparent to the active wavelengths employed by the emitters 12 and detectors 14, or may be selected from materials or may be provided with a physical configuration which imparts a desired beam shaping or focusing effect on the transmitted and reflected energies. The illustrated housing embodiment of FIG. 2 is particularly adapted for installation in a lower front corner of a vehicle window, as illustrated in FIG. 4. Such a housing may be used to accommodate other circuitry in addition to that of an obstacle detection system.

Figure 3:
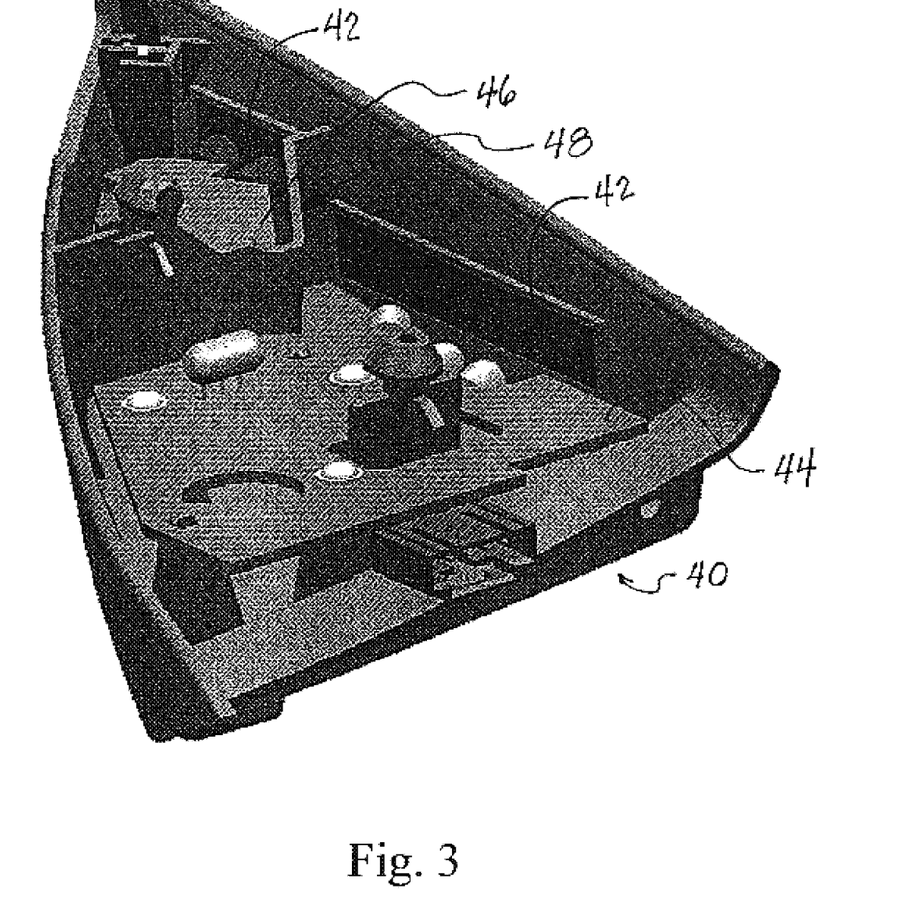
FIG. 3 is a perspective interior view of the housing of FIG. 2.

FIG. 3 provides a perspective illustration of the reverse side of the housing 40 shown in FIG. 2. In this embodiment, two discrete circuit boards 44, 46 are employed rather than the single, multi-segmented circuit board 20 of FIG. 1. Optical isolation between transmit and receiver elements is provided by an opaque or non-transmissive barrier integral to the housing. The placement of the housing 40 in relation to a vehicle door assembly is shown in FIG. 4.

Figure 5:
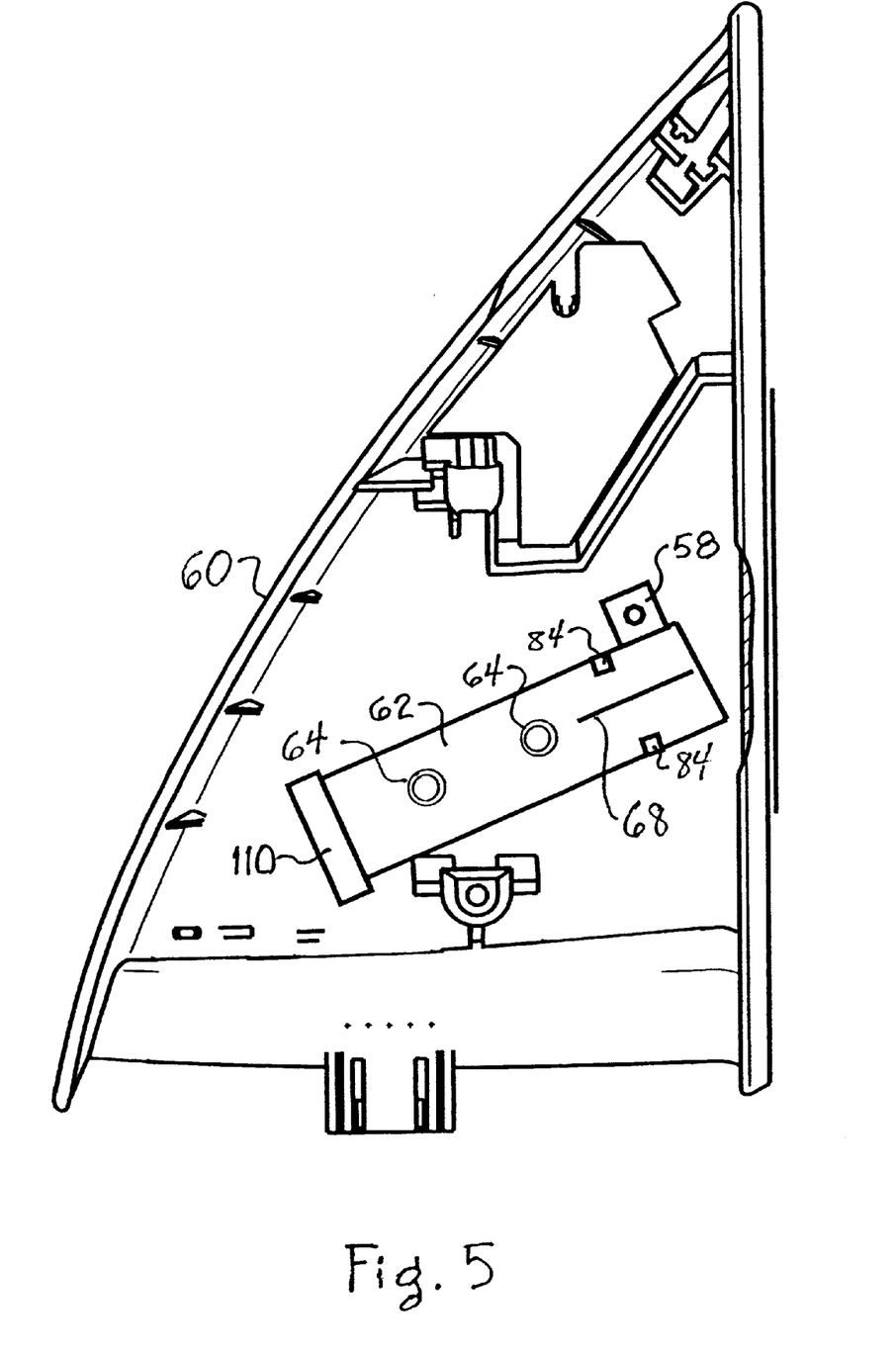
FIG. 5 is a diagrammatic view of components of a further embodiment of the obstacle detection system of FIG. 1.

FIG. 5, similar to FIG. 3, illustrates the reverse side of a housing 60 for use in mounting obstacle detection circuitry proximate an aperture to be monitored. In this case, however, the circuit boards 44, 46 have been replaced with a circuit board receptacle 62 or "cradle." The cradle 62, which in a preferred embodiment is formed of extruded plastic, is adapted for receiving a specifically configured circuit board or circuit boards and for enabling the accurate placement of the circuit board(s) in relation to the housing 60. One or more stanchions 64 are provided in the illustrated embodiment in order to accurately locate one or more circuit boards within the cradle 62. The cradle 62 may also be provided with one or more mounting flanges 58 for securing the cradle 62 to the housing 60. Threaded fasteners, heat tacking, gluing, or other fastening techniques may be employed to attach the cradle 62 to the housing 60. An energy barrier 68, such as a rectangular plane integral with the cradle 62, is also preferably provided in order to minimize light leakage between an emitter element and a receiver element, as described in further detail below. A protective cover (not shown) may also be provided once a circuit board and associated elements have been installed in the cradle 62.

Figures 6, 7:
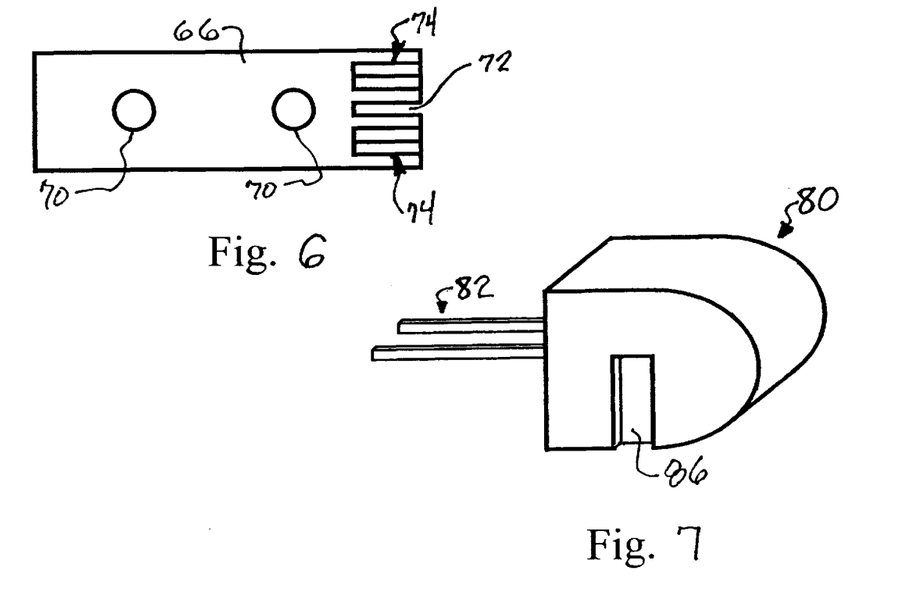
FIG. 6 is a plan view of a circuit board for use in the obstacle detection system embodiment of FIG. 5.
FIG. 7 is a perspective view of a lens module for use in the obstacle detection system embodiment of FIG. 5.

One form of circuit board particularly suited for installation in the cradle 62 of FIG. 5 is illustrated in FIG. 6. This circuit board 66 is provided with two openings 70 located for installation about the stanchions 64 of the cradle 62. Fasteners such as screws may also be employed to locate the circuit board 66 on the stanchions 64. The circuit board 66 of FIG. 6 is also provided with a slot 72 to enable the board 66 to be installed about the energy barrier 68 of the cradle 62. Receptacles 74 for electrically interfacing with emitter and detector elements are also provided in conjunction with the circuit board 66. Active circuit elements may be disposed on the circuit board as necessary in a fashion known to those skilled in the art.

While the embodiments of FIGS. 1 and 3 are suitable for many applications, in others, the provision of the emitter elements 12 and detector elements 14 remote from the respective lens 42 leads to tolerance stack-up. In other words, any misalignment of an emitter LED 12, for example, may be exacerbated by the respective lens 42. Similarly, if a receiver element 14 is not accurately aligned with a respective lens 42, an obstacle may not be detected or a false alarm may be triggered.

To address the effect of tolerance stack-up due to misalignment between a lens and an emitter or detector, also referred to as boresight error, it is preferable to minimize the distance between the lens and the respective emitter or detector elements and to eliminate independent movement therebetween. One aspect of the presently disclosed invention addresses this issue by providing an integrated lens module 80, as depicted in FIG. 7. One or more emitter or detector elements are accurately positioned within a mold for a lens, and the lens material is injected about the emitter or detector, thus forming an integrated module. Assuming the lens has been formed with the respective emitter or detector accurately positioned, such an integrated module eliminates any contribution to tolerance stack-up resulting from lens misalignment. As known to those skilled in the art, the lens module 80 forward surface may be molded to impart any necessary beam shaping, and is formed from a material chosen to have the desired impact (if any) on the energy transmitted therethrough. The active elements may also be associated with the lens after the lens has been fabricated. For instance, a bore may be formed in a pre-molded lens and the active element inserted then secured to the lens.

Electrical leads 82 in communication with the respective emitter or detector extend from a rear surface of the lens module 80 for connection to the remaining active circuitry of the obstacle detection system. For instance, lens modules 80 may be disposed in communication with receptacles 74 on the circuit board 66 of FIG. 6 and on either side of the energy barrier 68 integral with the cradle 62 of FIG. 5. Physical features such as tabs 84 may be provided in conjunction with the cradle 62 for interference with a corresponding groove or keyway 86 disposed on a surface of the lens module 80. Accurate alignment of the lens module 80 is thus provided. One tab 84 per lens module 80 is illustrated though more are provided in alternative embodiments.

Despite the reduction in tolerance stack-up afforded by the lens module 80, it is mandatory that the housing 40 be accurately positioned with respect to the environment in which the detection system operates. While various positioning and fastening arrangements are available, one particularly useful system includes the use of a variant of the so-called "christmas tree" fastener for mounting the detection system to the door sheet metal. A christmas tree fastener is typically provided as a cylindrical post having plural conical projections disposed along the length of the post. As the post is forced through an aperture of diameter slightly greater than that of the post, the conical projections deform then return to shape, thereby applying back-pressure and resisting extraction from the aperture. The presently disclosed variant on conventional fasteners enables the accurate mounting of an obstacle detection system at a point which is common from vehicle to vehicle, regardless of overlying trim and customization.

Figure 8:
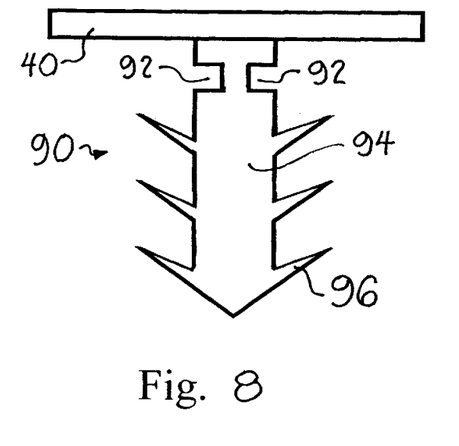
FIG. 8 is a cross-sectional view of a fastener for the presently disclosed obstacle detection system.

Due to the round cross-section of the conventional christmas tree post, such fasteners are prone to rotation or other movement after being installed. To address this deficiency, the presently disclosed system, in one embodiment, employs at least one and preferably several modified christmas trees 90 to fasten the housing 40, 60 to the vehicle trim. As shown in FIG. 8, the modification entails the formation of two parallel grooves 92 on opposite sides of the post 94. Both grooves are substantially orthogonal to the length of the post 94 and parallel to the conical projections 96.

Figure 9:
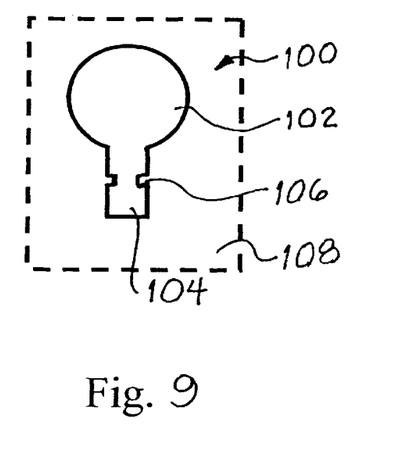
FIG. 9 is a plan view of an aperture for receiving the fastener of FIG. 8.

While the prior art has employed a circular aperture for receiving conventional christmas tree fasteners, the presently disclosed system includes the use of a key-hole shaped aperture 100, such as illustrated in FIG. 9, formed in the vehicle trim 108 or other mounting surface. The modified christmas tree 90 is inserted into a substantially circular opening 102 until the conical projections 96 have passed through the circular opening 102. The grooves 92 are then aligned with a slot 104 extending in the vehicle trim 108 from the circular opening 102. Preferably, the conical projection 96 most proximate the grooves 92 is in physical contact with the vehicle trim 108 adjacent the key-hole aperture 100 when the grooves 92 are aligned with the slot 104 to minimize relative movement of the fastener 90.

In one embodiment, the slot 104 of the key-hole aperture 100 includes one or more locking tabs 106 which will either physically interfere with the post 94, thus holding the post in place, or will allow the post to pass therebetween and will then act to resist movement of the post towards the circular opening 102. In the former case, receptacles (not shown) may be provided within the grooves to receive the tabs 106.

While one such modified christmas tree fastener 90 and key-hole shaped aperture 100 may suffice, it is believed preferable to provide plural fasteners 90 and apertures 100 to ensure proper gross alignment for the housing 40, 60 of the presently disclosed obstacle detection system.

Figure 10:
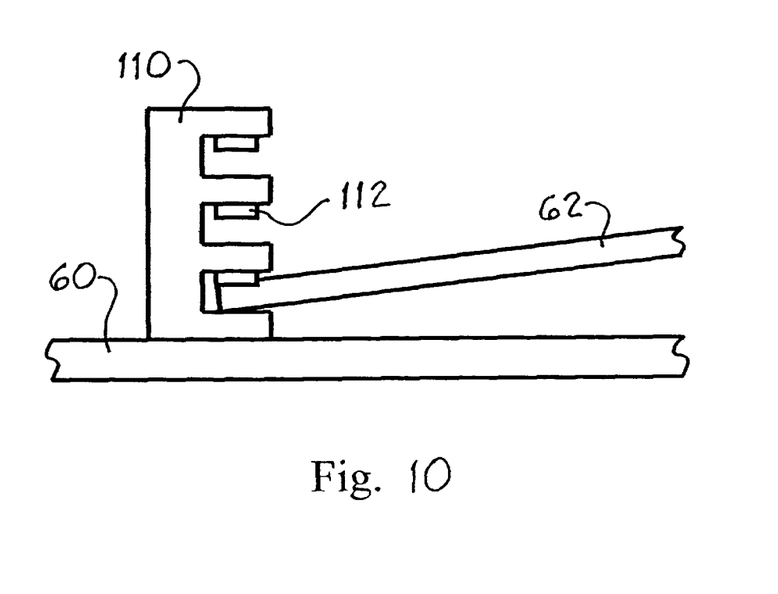
FIG. 10 is an elevation view of a first alignment mechanism for use with the presently disclosed obstacle detection system.

Another form of gross alignment mechanism for the detection system is illustrated in FIG. 10. The cradle 62 of FIG. 5 is shown schematically in elevation with respect to the housing 60. A multi-position bracket 110 enables one end of the cradle to be positioned at one of various positions relative to the housing 60 inner surface. A resilient member 112 such as a leaf spring is preferably provided in conjunction with each position in the bracket to resist movement of the member installed therein. Physical features such as tabs or keys matable with sockets or grooves may also be provided to positively engage the member installed in the bracket 110. The field of view of the active elements located at the opposite end of a circuit board 66 installed in the cradle 62 is thus adjusted as the cradle 62 is relocated from one bracket 110 position to another. In this case, the stanchions 64 projecting from the housing 60 into the bottom of the cradle 62 are intended primarily to resist lateral motion of the cradle 62, parallel to the major surface of the housing 60.

In an alternative embodiment, the circuit board 66 is engaged on a variant of the cradle 62, the cradle itself supporting a multi-position bracket 110 such as that shown in FIG. 10. Further still, in the absence of a cradle 62, a circuit board 20 such as shown in FIG. 1 may be disposed within one of the positions in such a bracket 110 mounted in the housing 40. Such a bracket 110 may be employed in a further embodiment in conjunction with one or more subsections of a multi-sectioned circuit board 20 as shown in FIG. 1. Moreover, the bracket 110, while illustrated as a discrete unit, may be provided as a plurality of mutually-parallel ribs on the surface of the vehicle trim.

Despite the flexibility afforded by the multi-position bracket 110 of FIG. 10 and its ability to be adapted for use with a cradle 62, a circuit board 66 to be installed in such a cradle 62, or independent circuit boards 44, 46, a circuit board assembly 20 such as that shown in FIG. 1, it is often necessary to enable further refinement of the field of view of the obstacle detection system's active elements. To this end, one embodiment of the presently disclosed invention, illustrated in FIG. 11, provides the ability to finely adjust a circuit board 120 orientation in three dimensions relative to a housing.

Figure 11:
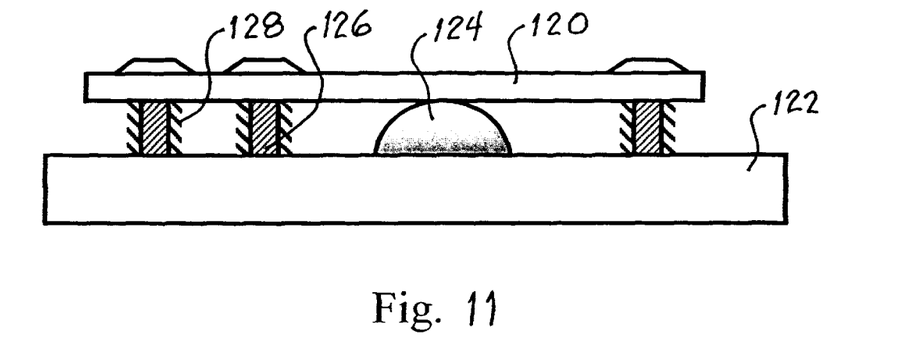
FIG. 11 is an elevation view of a second alignment mechanism for use with the presently disclosed obstacle detection system.

The circuit board 120 of FIG. 11 may represent the segmented circuit board 20 of FIG. 1, either of the unitary circuit boards 44, 46 of FIG. 3, or the cradle-mounted circuit board 66 of FIG. 6. In addition, the cradle 62 of FIG. 5 may be mounted to the housing 60 in the same manner. In any case, the circuit board 120 is in contact with a projection 124 extending from a mounting surface 122. The mounting surface 122 may be represented by the housing 40 (FIG. 3), the housing 60 (FIG. 5), or the cradle 62 (FIG. 5). As shown, the projection 124 is frusto-spherical, though any shape affording a pivot point in contact with the circuit board 120 or other surface to be aimed may be substituted. Additionally, while the projection 124 is preferably disposed on the mounting surface 122, it may also be formed on the circuit board 120 itself and extend into contact with the mounting surface 122.

The circuit board 120 is mechanically joined to the underlying mounting surface 122 through the use of at least three height-adjustable fasteners 126 such as screws. Resilient elements 128 such as springs are preferably provided intermediate the circuit board 120 and the mounting surface 122, about the fasteners 126, in order to maintain the circuit board 120 in a desired position relative to the mounting surface 122. By adjusting the height of one or more fasteners 126, the angle of inclination of the circuit board 120 is manipulated. Depending upon the pitch of the fastener 126 threads, very fine adjustment of the circuit board orientation relative to the housing may be achieved.

These and other examples of the invention illustrated and described above are intended by way of example and the actual scope of the invention is to be limited solely by the scope and spirit of the following claims.

What is claimed is:

1. An obstacle detection system, comprising:
   a monitor subsystem comprising
      a housing,
      at least one circuit board disposed in association with said housing,
      an emitter element disposed on said at least one circuit board for generating an energy field,
      a detector element disposed on said at least one circuit board for receiving at least a portion of said energy field, and
      at least one lens for redirecting said energy field; and
   a mounting subsystem comprising
      at least one locating member,
      a gross adjustment mechanism for enabling positioning of said at least one circuit board to a first degree of accuracy, and
      a fine adjustment mechanism for enabling positioning of said at least one circuit board to a second degree of accuracy,
   wherein said second degree of accuracy is greater than said first degree of accuracy.

2. The system of claim 1, wherein said emitter element and said detector element are disposed on an edge of said at least one circuit board.

3. The system of claim 1, wherein said at least one circuit board is comprised of plural rigid circuit boards mechanically connected by a flexible circuit board.

4. The system of claim 1, wherein said emitter element is comprised of plural discrete emitters, and wherein said detector element is comprised of plural discrete detectors.

5. The system of claim 1, wherein said housing comprises an energy barrier intermediate said emitter element and said detector element.

6. The system of claim 1, wherein said at least one lens comprises an emitter lens substantially proximate said emitter element and a detector lens substantially proximate said detector element.

7. The system of claim 1, wherein said emitter element is integral with said emitter lens.

8. The system of claim 1, wherein said detector element is integral with said detector lens.

9. The system of claim 1, wherein said at least one lens comprises at least one keyway for enabling accurate alignment of said at least one lens with respect to said at least one circuit board.

10. The system of claim 9, wherein said housing comprises a projection configured to mechanically interact with said at least one keyway to facilitate accurate installation of said at least one lens with respect to said housing.

11. The system of claim 1, further comprising a pivot point projecting from said housing and intermediate said housing and said at least one circuit board, wherein said fine adjustment mechanism enables said at least one circuit board to be oriented about said pivot point and relative to said housing.

12. The system of claim 11, wherein said fine adjustment mechanism comprises plural height-adjustable spacing members intermediate said at least one circuit board and said housing, whereby the distance between said at least one circuit board and said housing at each of said fine adjustment mechanisms is independently adjustable.

13. The system of claim 12, wherein each of said height-adjustable spacing members comprises a threaded fastener in threaded engagement with one of said at least one circuit board and said housing, whereby rotation of said threaded fastener in a first direction draws that portion of said at least one circuit board towards said housing, and whereby rotation of said threaded fastener in a second direction forces that portion of said at least one circuit board away from said housing.

14. The system of claim 12, wherein said height-adjustable spacing members each further comprise a resilient member for urging said housing and said at least one circuit board apart.

15. The system of claim 12, wherein said plural height-adjustable spacing members are radially distributed about said pivot point.

16. The system of claim 1, wherein said gross adjustment mechanism comprises plural, substantially parallel ribs, whereby said at least one circuit board is adapted for being disposed on one of said plural, substantially parallel ribs, whereby an angle of said at least one circuit board with respect to said housing is determined by which of said plural, substantially parallel ribs said at least one circuit board is disposed upon.

17. The system of claim 16, wherein said gross adjustment mechanism further comprises resilient members for urging said at least one circuit board against one of said plural, substantially parallel ribs.

18. The system of claim 1, wherein each of said at least one locating member comprises a projection extending from a surface of said housing opposite said at least one circuit board.

19. The system of claim 18, wherein said projection is substantially orthogonal to said surface of said housing.

20. The system of claim 18, wherein said projection comprises a substantially cylindrical post, said post having at least one groove disposed therein, said at least one groove being substantially parallel to said housing surface.

21. The system of claim 20, wherein said projection further comprises a plurality of frusto-conical projections extending in a mutually-spaced relationship substantially symmetric about said post.

* * * * *